(No Model.)

W. R. SOMERS.
DRIVING ATTACHMENT FOR SEWING MACHINES.

No. 273,627. Patented Mar. 6, 1883.

Attest:
Coult. A. Cooper
H. C. Hansmann

William R. Somers,
Inventor
By Charles E. Foster
Atty.

UNITED STATES PATENT OFFICE.

WILLIAM R. SOMERS, OF BRIDGEPORT, CONNECTICUT.

DRIVING ATTACHMENT FOR SEWING-MACHINES.

SPECIFICATION forming part of Letters Patent No. 273,627, dated March 6, 1883.

Application filed January 20, 1883. (No model.)

*To all whom it may concern:*

Be it known that I, WILLIAM R. SOMERS, a citizen of the United States, and a resident of Bridgeport, in the county of Fairfield and State of Connecticut, have invented certain new and useful Improvements in Driving Attachments for Sewing-Machines, of which the following is a specification.

My invention is a device constructed as fully described hereinafter, whereby the operator of a sewing-machine may quickly and easily put the same into and out of connection with a main power driving-shaft, the same being specially adapted for use in factories where large numbers of machines are driven from the same shaft.

Figure 1:
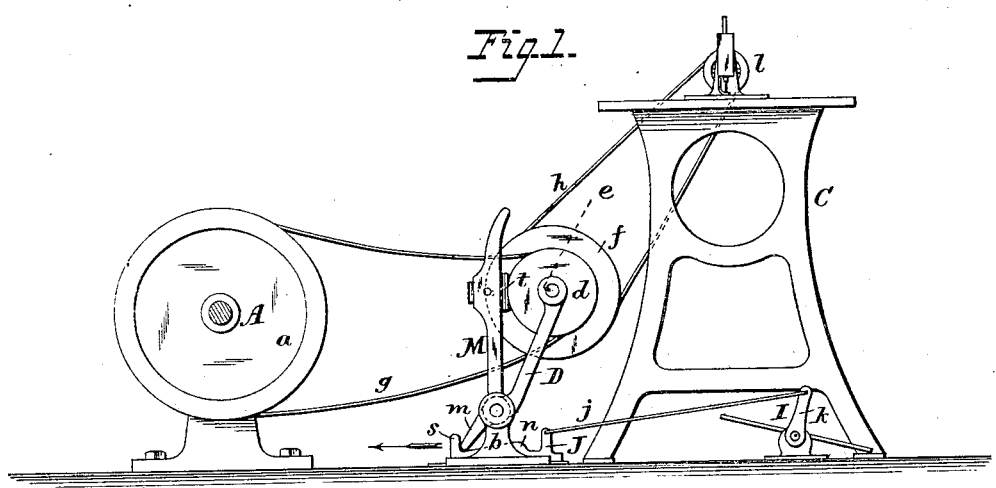
Figure 2:
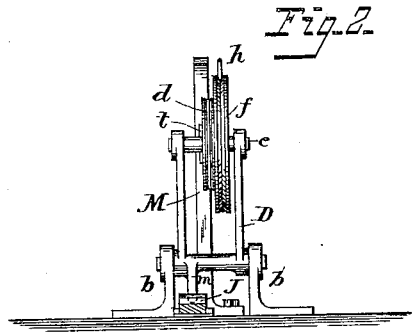

In the drawings, Figure 1 is an elevation showing the main driving-shaft, a sewing-machine, and intermediate starting and stopping device. Fig. 2 is a side elevation of said device.

A is the main driving-shaft of a number of machines, provided with a series of pulleys, $a$, one arranged opposite each machine C. Between each pulley and the opposite machine are standards $b$, between which is hung a frame, D, carrying a shaft, $e$, upon which are arranged two grooved pulleys, $d\ f$, the former receiving the belt $g$ from the pulley $a$, and the latter the belt $h$, which extends to the driving-wheel $l$ of the sewing-machine.

With the frame D are combined devices, under the ready control of the operator of a sewing-machine, whereby the said frame may be moved or vibrated so as to tighten or slacken the belt $g$, the slackening of the belt causing it to pass loosely around the pulley $d$, thereby arresting the motion of the machine, while the tightening of the belt insures the rotation of both pulleys $d\ f$ and the transmission of motion to the machine.

Different devices may be used for enabling the operator to move the frame D. For instance, it may be connected by a rod, $j$, to an arm, $k$, of a double treadle, I, hung adjacent to the machine, so that by rocking it in one direction or the other by the operator's foot the frame D will be moved to or from the pulley $a$. Instead of connecting the rod $j$ directly to the frame D, however, I prefer to attach it to a slide, J, beneath the arm $m$, extending from the frame D, and having an inclined or wedge-shaped projection, $n$, and lip $s$. When the treadle is tilted to throw the carriage in the direction of the arrow, the wedge, coming beneath the arm $m$, will swing the frame D away from the pulley $a$ and tighten the belt. An opposite movement will bring the lip $s$ against the arm $m$, swing the frame D toward the pulley $a$, and loosen the belt. To prevent the momentum of the pulleys from continuing the motion of the machine after the belt is slackened, I bring one of the pulleys against a brake-shoe, $t$, supported by a standard, M.

It will be apparent that by the arrangement described the machine may be thrown into and out of operation and retained in either condition without the operator being obliged to maintain a constant pressure upon the treadle or other moving device.

I claim—

1. The combination, with a driving-shaft and its pulley and with a sewing-machine, of a movable frame, D, carrying pulleys $d\ f$, with belts passing to the driving and machine pulleys, and appliances whereby the frame may be moved to and from the driving-pulley, substantially as set forth.

2. The combination, with the movable frame carrying pulleys with belts passing to the driving and machine pulleys, of a standard, M, carrying a shoe, $t$, substantially as set forth.

3. The combination of the movable frame, arranged between the driving-pulley and the machine, and treadle I, connected to operate the frame, substantially as specified.

4. The pivoted frame D, carrying pulleys $d$ and $f$, and provided with an arm, $m$, in combination with the slide J, having a wedge, $n$, and lip $s$, and a device for moving the slide from a position adjacent to the machine, substantially as set forth.

In testimony whereof I have signed my name to this specification in the presence of two subscribing witnesses.

WILLIAM R. SOMERS.

Witnesses:
JAMES ALFORD HOUSE,
CHARLES H. DIMOND.